(12) United States Patent
Chavot et al.

(10) Patent No.: US 7,090,176 B2
(45) Date of Patent: Aug. 15, 2006

(54) ARTICULATED SUPPORT WITH LATERAL MOVEMENT FOR HIGH-VOLTAGE OR MEDIUM-VOLTAGE ELECTRICAL PLANT

(75) Inventors: Michel Chavot, Brison-Saint-Innocent (FR); Jean Louis Habert, Epersy (FR)

(73) Assignee: Areva T&D SA, Levallois-Perret (FR)

( * ) Notice: Subject to any disclaimer, the term of this patent is extended or adjusted under 35 U.S.C. 154(b) by 120 days.

(21) Appl. No.: 10/778,351

(22) Filed: Feb. 17, 2004

(65) Prior Publication Data
US 2005/0205726 A1    Sep. 22, 2005

(30) Foreign Application Priority Data
Feb. 21, 2003 (FR) .................................. 03 02167

(51) Int. Cl.
*A45D 19/04* (2006.01)
(52) U.S. Cl. ...................... 248/127; 211/200; 211/201; 211/202; 248/150; 248/676
(58) Field of Classification Search ................ 248/127, 248/676, 136, 150, 130, 165, 166; 211/200, 211/201, 202; 108/118
See application file for complete search history.

(56) References Cited

U.S. PATENT DOCUMENTS

| | | | |
|---|---|---|---|
| 2,985,316 A * | 5/1961 | Ruhnke | 211/201 |
| 4,577,826 A | 3/1986 | Bergstroem et al. | 248/638 |
| 6,161,359 A * | 12/2000 | Ono | 52/651.1 |
| 6,499,705 B1 * | 12/2002 | Tsai | 248/167 |
| 6,851,564 B1 * | 2/2005 | Ng | 211/149 |

* cited by examiner

*Primary Examiner*—Ramon O Ramirez
(74) *Attorney, Agent, or Firm*—Oblon, Spivak, McClelland, Maier & Neustadt, P.C.

(57) ABSTRACT

A support for high-voltage or medium-voltage electrical plant comprises four columns placed on a support surface and connected in pairs by crossmember assemblies. The columns are each articulated to rotate about a first horizontal axis at their end resting on the support surface and about a second horizontal axis on a top crossmember at their other end. The first and second axes are parallel. Two opposite crossmember assemblies allow the two columns connected by one or the other of these two assemblies to move in a stable manner in their rotation plane.

13 Claims, 6 Drawing Sheets

FIG_1
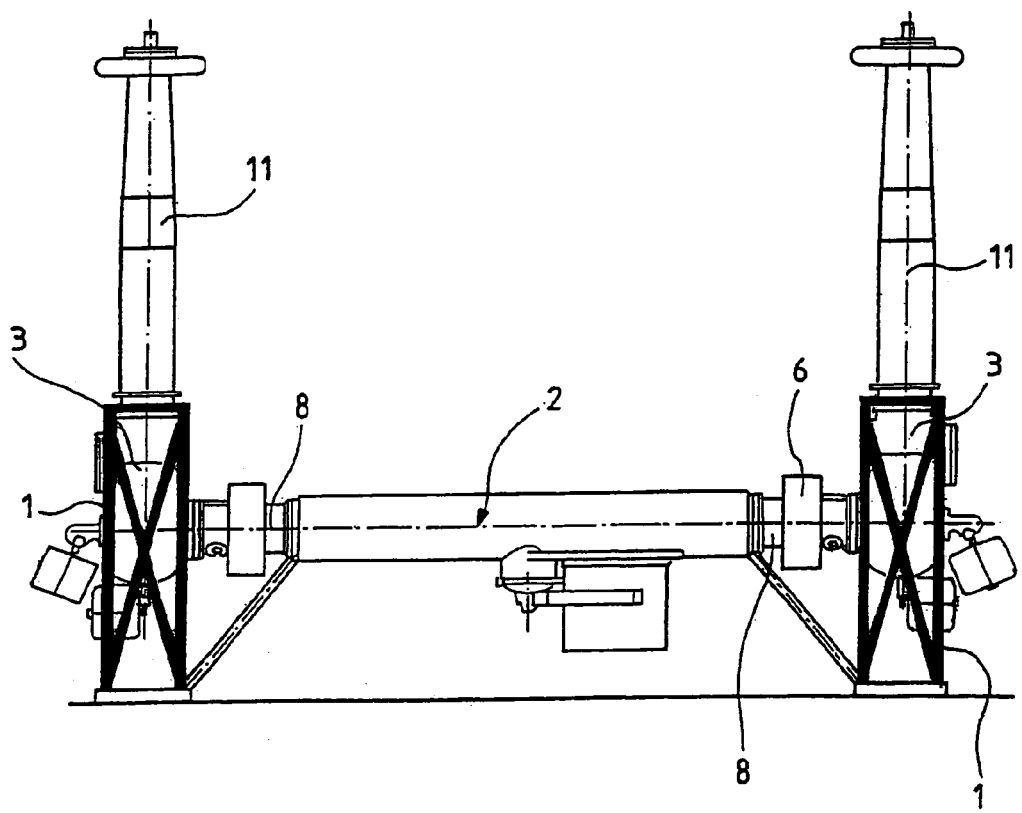
PRIOR ART

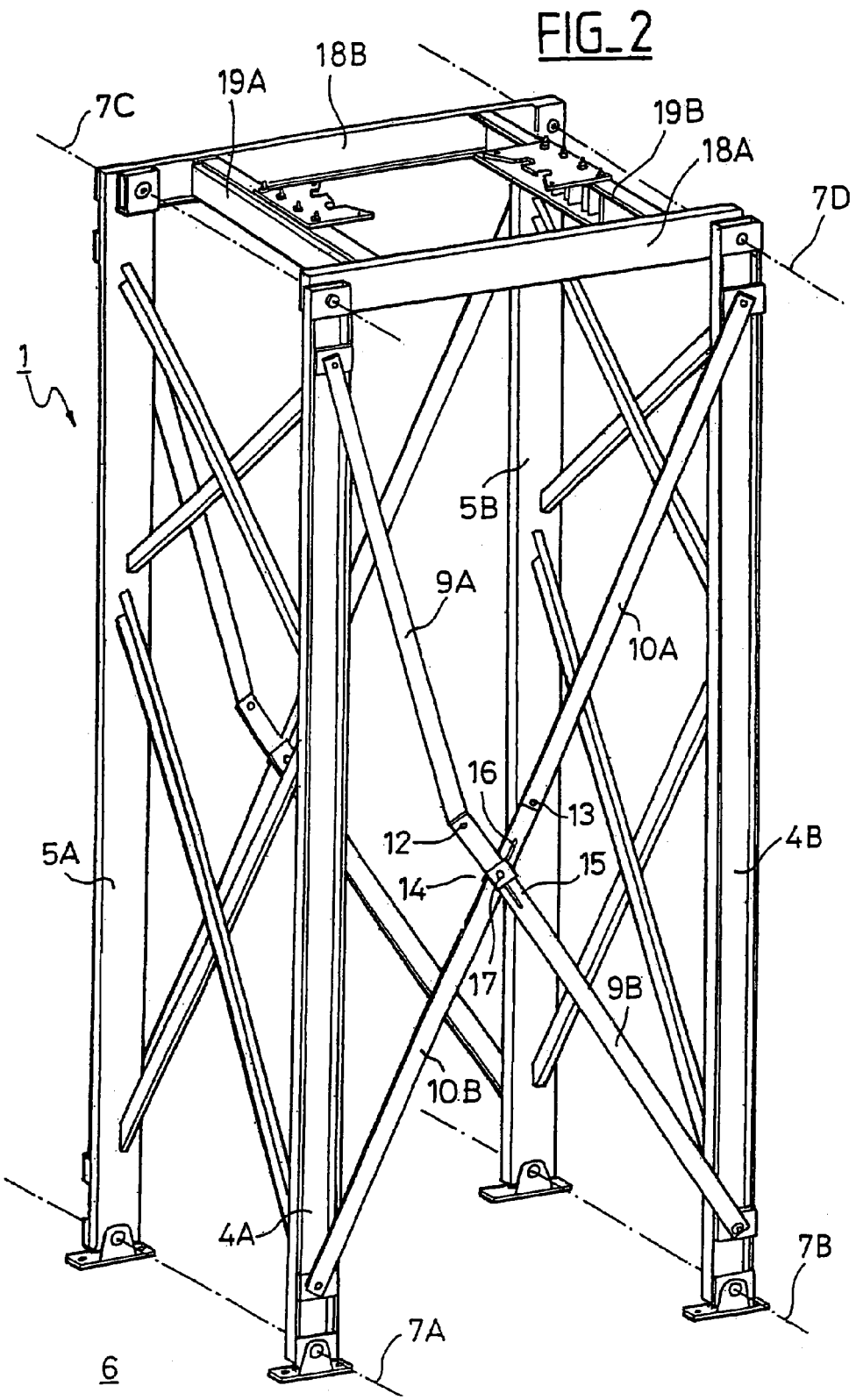

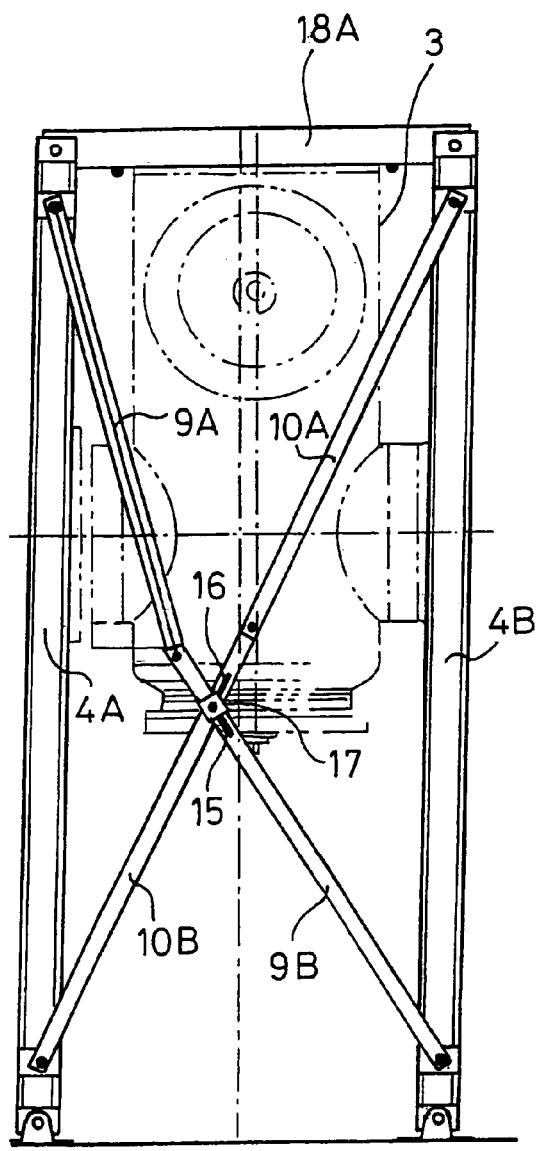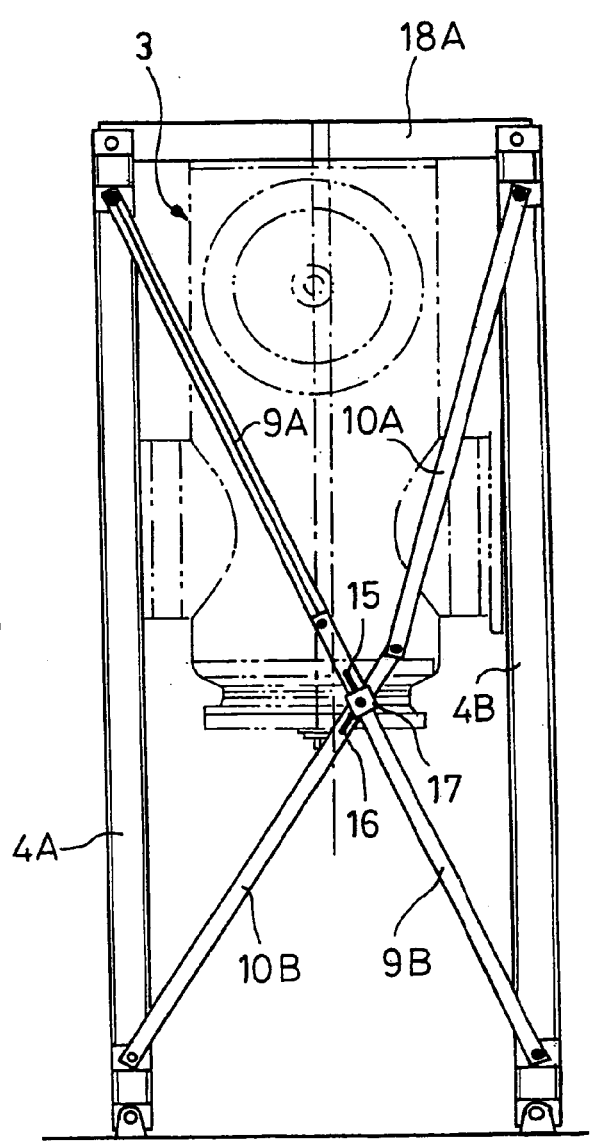

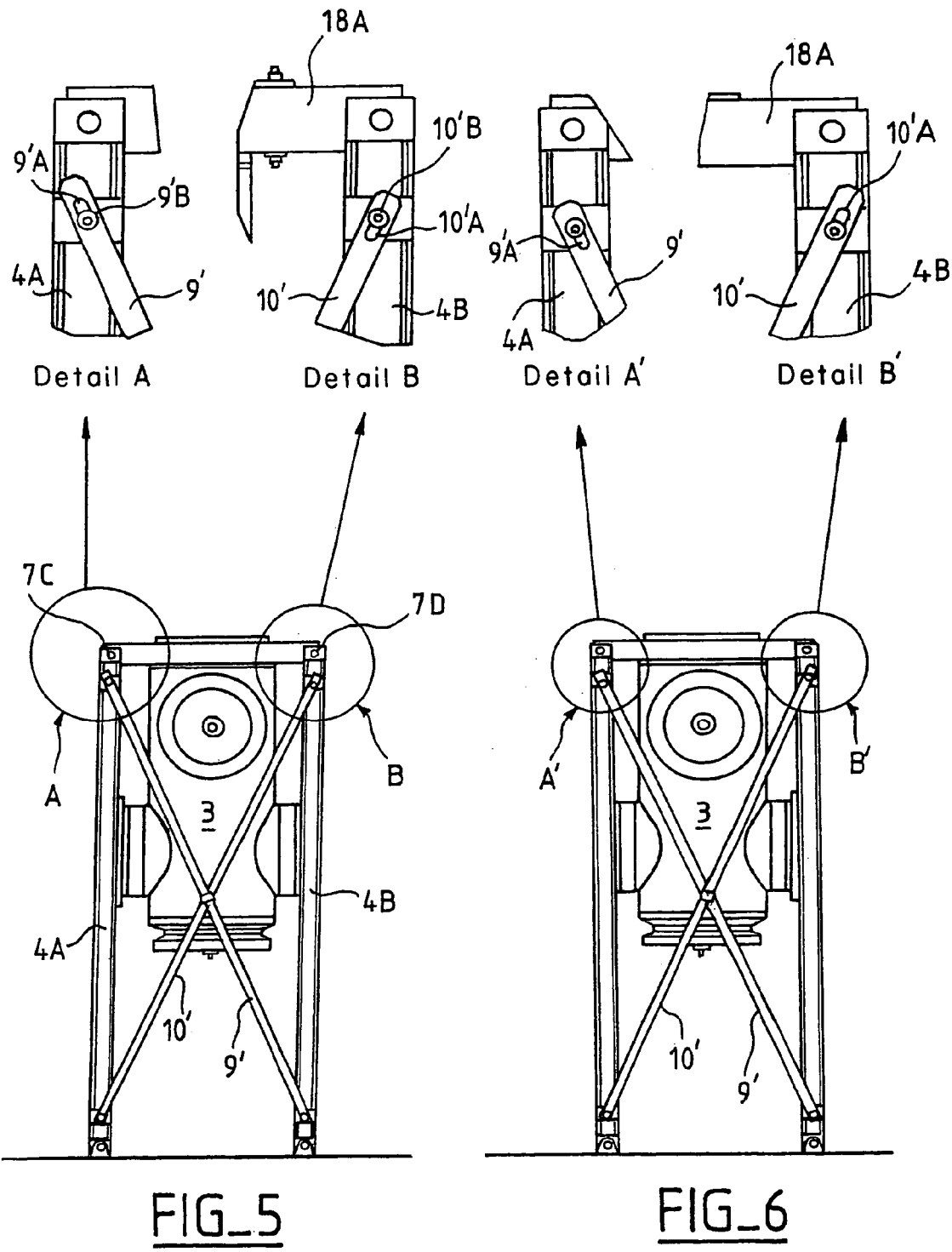

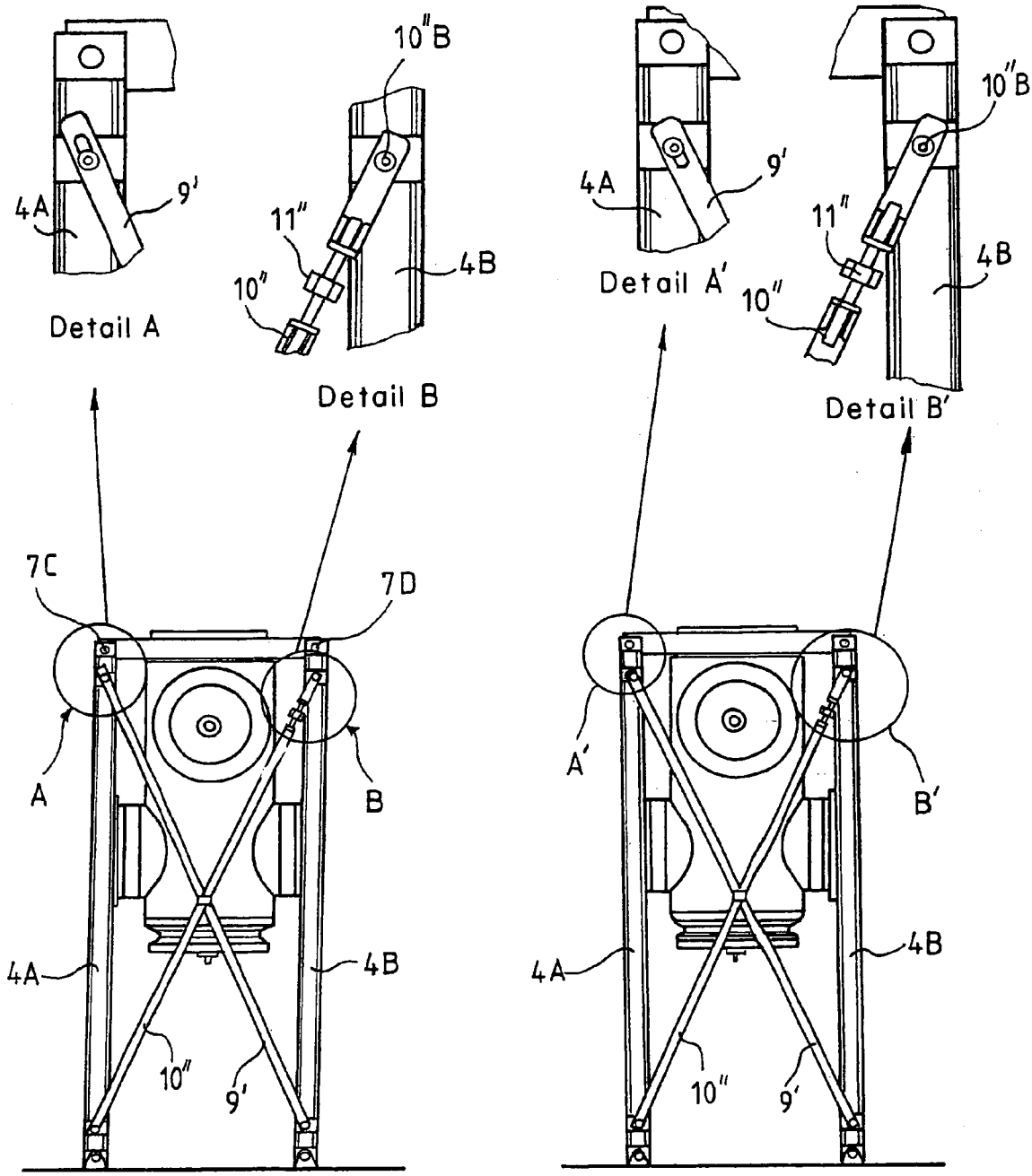
FIG_7    FIG_8

FIG_9
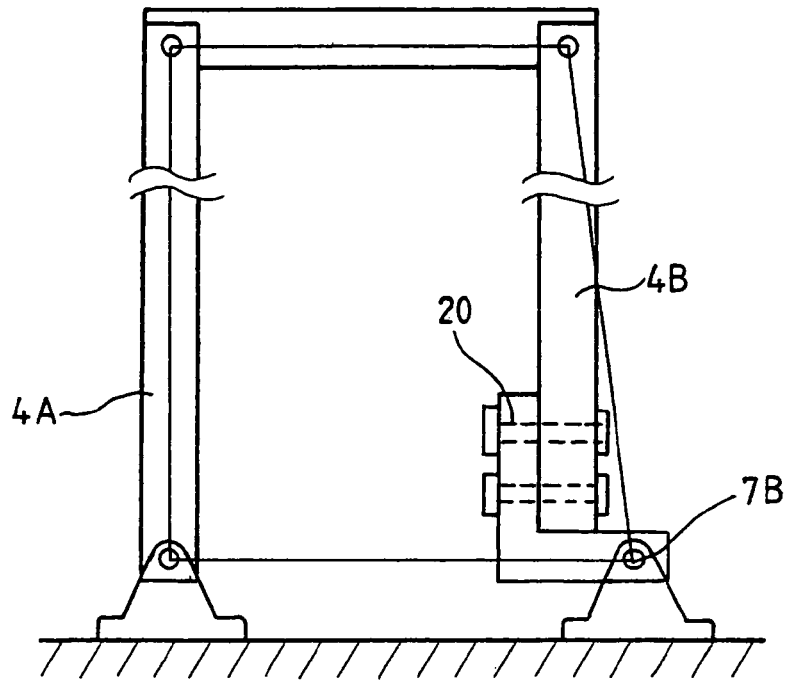
FIG_10
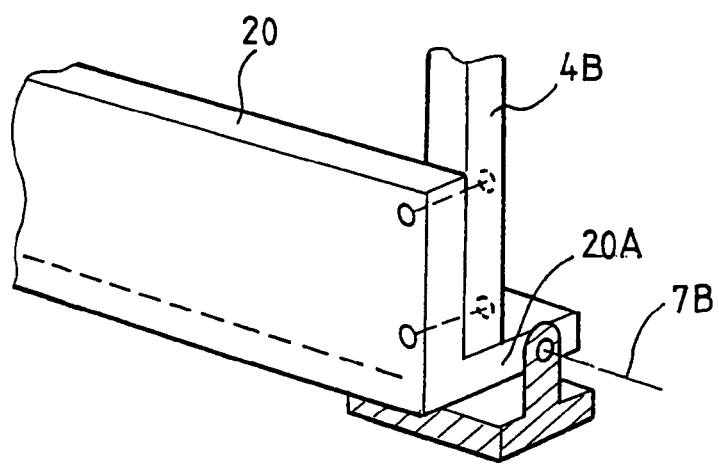

ARTICULATED SUPPORT WITH LATERAL MOVEMENT FOR HIGH-VOLTAGE OR MEDIUM-VOLTAGE ELECTRICAL PLANT

BACKGROUND OF THE INVENTION

1. Field of the Invention

The present invention relates to an articulated support with lateral movement for high-voltage or medium-voltage electrical plant.

To be more precise, it relates to a support for high-voltage or medium-voltage electrical plant comprising four columns placed on a support surface and connected in pairs by four assemblies of crossmembers.

2. Description of the Prior Art

This kind of support is used in shielded electrical plant housed in a metal enclosure, as shown in FIG. 1.

Such plant includes a shielded horizontal circuit-breaker 2 connected at each of its two ends by way of a connecting compartment 8 to a shielded disconnector 3. The connecting compartment 8, carrying a toroidal current transformer 6, is closed in a manner known in the art by insulative cones. An overhead line bushing 11 is mounted on top of each disconnector 3 which, together with the bushings and ancillary plant, are supported by a support 1 resting on the ground.

In the above kind of prior art plant, each support 1 is fixed to the ground directly or indirectly and comprises four substantially vertical columns connected in pairs by four crossmember assemblies. Each crossmember assembly comprises two crossmembers that cross over each other, as shown in FIG. 1, for example. The columns and crossmembers are rigidly connected.

It might prove necessary to demount the circuit-breaker 2 rapidly, for example in the event of a malfunction, without deinstalling the other plant (disconnectors and overhead line bushings). In particular, it would be particularly advantageous for the disconnectors and overhead line bushings to remain pressurized with dielectric gas and live. At present, demounting the circuit-breaker interferes greatly with the operation of the electrical substation in which the plant shown in FIG. 1 is installed, as it implies disconnecting at least one of the two overhead lines and demounting the bushing-disconnector-framework assembly on the side that is disconnected, which is a long, complex and difficult process.

In particular, this process generally necessitates the provision of plant such as a crane to provide additional and temporary support for the overhead lines. It must be possible for each support 1 to be detached from the ground in order for the assembly that it supports to be moved away from the circuit-breaker 2 by a distance of the order of ten centimeters to release the circuit-breaker, whilst preventing the cable connected to the bushing causing significant tilting of the assembly caused by the high traction forces that the cable exerts on the crossmember, and therefore the resulting high torque on the support. For safety reasons, the additional and temporary support must not be live, which necessitates disconnecting at least the overhead line held by temporary support.

The invention solves the above problem by proposing an articulated support with lateral movement making it a simple matter to move high-voltage or medium-voltage electrical plant without additional plant, without necessitating the application of high physical forces, and with no risk of out of limits movement that could in particular cause the plant and its support to tip over.

SUMMARY OF THE INVENTION

To solve the above technical problem, the invention proposes a support for high-voltage or medium-voltage electrical plant, comprising four columns adapted to be placed on a support surface and connected in pairs by crossmember assemblies, in which support said columns are each articulated to rotate about a first horizontal axis at their end resting on the support surface and about a second horizontal axis on a top crossmember at their other end, the first and second axes being parallel, and two opposite crossmember assemblies are adapted to allow the two columns connected by one or the other of these two assemblies to move in a stable manner in their rotation plane.

The support according to the invention has no separate parts that have to be demounted, requires no major additional plant, and allows costly electrical plant weighing several tons to be moved safely.

In a preferred embodiment the two opposite crossmember assemblies each comprise two crossing crossmembers whose uprights have on two corresponding columns a first articulation for rotation about a third axis perpendicular to the longitudinal axis of the columns.

The two crossing crossmembers of the opposite crossmember assemblies preferably each comprise an arrangement for modifying the distance between their two first rotational articulations.

In a first embodiment the two crossmembers of the opposite crossmember assemblies each comprise two crossmember sections connected end-to-end by a second articulation for rotation about an axis parallel to the third axis.

In a second embodiment the modification arrangement comprises a connecting arrangement allowing one end of the crossmember to move relative to the corresponding column.

In this case the connecting arrangement advantageously comprises a longitudinal slot on the crossmember and through which the first rotation articulation passes.

In a third embodiment the modification arrangement comprises an arrangement for adjusting the length of the crossmember.

In this case the arrangement for adjusting the length of the crossmember is advantageously a turnbuckle.

The two crossmembers of the opposite crossmember assemblies are preferably connected together by a connecting arrangement allowing their relative movement.

In this case the connecting arrangement advantageously comprises a longitudinal slot on each of the crossmembers and a clamping member passing through both the slots.

Generally speaking, the two crossmember assemblies are advantageously symmetrical with respect to a vertical plane of symmetry of the support.

The invention also provides shielded electrical plant housed in a metal enclosure and comprising a substantially horizontal first unit and, at one end at least of said first unit, a second electrical unit carried by a support according to the invention.

Said first unit is preferably a circuit-breaker.

The invention is described in more detail hereinafter with reference to figures showing only preferred embodiments of the invention.

BRIEF DESCRIPTION OF THE DRAWINGS

FIG. 1 shows a prior art support and has already been explained.

FIG. 2 is a perspective view of a first embodiment of a support according to the invention.

FIGS. 3 and 4 are front views of a support conforming to this first embodiment, with some of the electrical plant shown in dashed outline, moved laterally toward the left and toward the right.

FIGS. 5 and 6 are front views of a support conforming to a second embodiment, with some of the electrical plant shown when moved laterally toward the left and toward the right.

FIGS. 7 and 8 are front views of a support conforming to a third embodiment, with some of the electrical plant shown when moved laterally toward the left and toward the right.

FIGS. 9 and 10 are respectively a diagrammatic front view and a detailed diagrammatic perspective view of a different embodiment.

DETAILED DESCRIPTION OF THE PREFERRED EMBODIMENTS

FIGS. 2 to 4 show a first embodiment of the invention.

A support 1 for high-voltage or medium-voltage electrical plant comprises four substantially vertical columns 4A, 4B, 5A, 5B placed on a horizontal support surface 6, for example the ground.

The ends of the columns 4A, 4B, 5A, 5B resting on the ground are articulated about horizontal axes 7A, 7B.

The columns are connected in pairs by four crossmember assemblies, the two lateral crossmember assemblies shown in FIG. 2 being rigidly connected to the corresponding columns 4A and 5A, 4B and 5B and each consisting of crossing crossmembers that are rigidly connected together. One of said lateral crossmember assemblies is adapted to provide sufficient space for one end of a connection 8 to the adjacent shielded component 3 in the FIG. 1 application example.

The other two crossmember assemblies, one at the front and one at the rear, are symmetrical with respect to the vertical plane of symmetry of the support, and for simplicity only the front assembly is described and its components identified by reference numbers here.

The assembly between the two columns 4A and 4B comprises two crossing crossmembers 9 and 10 whose ends are articulated to the corresponding two columns 4A, 4B to rotate about horizontal axes and a top horizontal crossmember 18A whose ends are likewise articulated to the corresponding two columns 4A, 4B to rotate about horizontal axes 7C, 7D. Each crossmember comprises two crossmember sections 9A and 9B, 10A and 10B, connected end-to-end by an articulation 12, 13 for rotation about a horizontal axis.

The horizontal articulation axes at the ends of the crossmembers 9, 10 are at the same first height in the case of the lower ends and the same second height in the case of the upper ends.

A connecting arrangement 14 under the articulations 12, 13 connects together the two crossmembers 9, 10. The connecting arrangement 14 comprises a longitudinal slot 15, 16 on each of said crossmembers and a clamping member 17 passing through these two slots. The clamping member 17 is of the nut-and-bolt type. The connecting arrangement 14 allows relative movement of the crossmembers 9, 10 over a given range.

The combination of the columns 4A, 4B and the horizontal crossmember 18A therefore forms a deformable parallelepiped or a trapezium whose movement is limited by the crossing crossmembers 9, 10.

FIGS. 3 and 4 show the two extreme positions of this assembly.

FIG. 3 shows the maximum movement toward the right, with the crossmember sections 10A and 10B in tension and aligned and the clamping member 17 abutted against the left-hand end of the slots 15, 16 in the crossmember sections 9A, 10A. FIG. 4 shows the maximum movement toward the left, with the crossmember sections 9A and 9B in tension and aligned- and the clamping member 17 abutted against the right-hand end of the slots 15, 16 in the crossmember sections 9A, 10A. More generally, the maximum movement is not defined by the length of the slots 15, 16 but by the alignment and tensioning of the two sections of one of the crossmembers.

Between these two extreme positions, the front crossmember assembly can assume any intermediate position, locked rigidly by locking the clamping arrangement 14.

The rear crossmember assembly is symmetrical to the front crossmember assembly with respect to the vertical plane of symmetry of the support, and the two horizontal crossmembers 18A, 18B of these assemblies are rigidly connected by at least one rigid crossmember 19, in this example two rigid crossmembers 19A, 19B.

In its specific application already described and shown in FIG. 1, the support 1 carries a disconnector 3 shown in dashed outline in FIGS. 3 and 4 and an overhead line bushing, not shown in these figures.

The extreme position shown in FIG. 3 presupposes that it is required to detach the disconnector 3 from electrical plant such as a shielded circuit-breaker 2, as shown in FIG. 1, situated on the right-hand side of the support as seen in FIG. 3. The extreme position shown in FIG. 4 presupposes that it is required to detach the disconnector 3 from electrical plant such as a shielded circuit-breaker 2, as shown in FIG. 1, situated on the left-hand side of the support as seen in FIG. 4.

The invention therefore makes it possible to design a support with maximum movement and to use it with different plant, a smaller movement being set by locking the clamping arrangement 14 accordingly.

The locking of the support in a maximum or intermediate movement position is sufficient to withstand the high torque to which the support is subjected and that are caused by high traction forces that the line cable exerts on the overhead cable bushing of the supported switchgear. It is therefore not necessary to provide additional and temporary support for the line cables, which enables the lines to remain live.

FIGS. 5 and 6 show a second embodiment of the invention.

The second embodiment differs from the previous embodiment only in the design of the opposite crossmember assemblies, which are all that is described hereinafter.

The front and rear crossmember assemblies are symmetrical with respect to the vertical plane of symmetry of the support and for simplicity only the front assembly is described and its components identified by reference numbers here.

That assembly, disposed between the two columns 4A and 4B, comprises two crossing crossmembers 9' and 10' connected together non-rigidly. They are advantageously connected at their crossing point by a slotted connecting arrangement of the same type as the connection arrangement 14 shown in FIG. 2. The ends of the crossmembers 9' and 10' are articulated to the corresponding columns 4A, 4B to rotate about horizontal axes and a horizontal top crossmember 18A has its ends articulated to the corresponding two columns 4A, 4B to rotate about horizontal axes 7C, 7D.

Each of the crossmembers 9' and 10' has at its upper end a connecting arrangement allowing the crossmember 9' or 10' in question to move relative to the corresponding column 4A or 4B at that end. These connecting arrangements are similar and each comprises a longitudinal slot 9'A and 10'A at the end of the corresponding crossmember 9', 10' through which passes the rotational articulation of that end to the corresponding column that forms a pivot 9'B, 10'B on the corresponding column.

These connecting arrangements allowing relative movement of the crossmembers can be provided at the upper ends, as shown here, and/or the lower ends of the crossmembers 9', 10'.

FIG. 5 shows the maximum movement toward the right. The pivot 10'B of the right-hand column 4B then abuts against the upper end of the slot 10'A of the crossmember.

Conversely, FIG. 6 shows the maximum movement toward the left. The pivot 9'B of the right-hand column 4A then abuts against the upper end of the slot 9'A of the crossmember 9'.

The rear crossmember assembly is symmetrical to the front crossmember assembly with respect to the vertical plane of symmetry of the support.

In its specific application already described and shown in FIG. 1, the support carries a disconnector 3 and an overhead line bushing, not shown in FIGS. 5 and 6.

A third embodiment of the invention is described with reference to FIGS. 7 and 8.

This third embodiment differs from the previous embodiments only in the design of the opposite crossmember assemblies, which are all that is described hereinafter.

The front and rear crossmember assemblies are symmetrical with respect to the vertical plane of symmetry of the support and for simplicity only the front assembly is described and its components identified by reference numbers here.

That assembly, disposed between the two columns 4A and 4B, comprises two crossing crossmembers 9' and 10" connected together non-rigidly. They are advantageously connected at their crossing point by a slotted connecting arrangement of the same type as the connecting arrangement 14 shown in FIG. 2. The ends of the crossmembers 9", 10" are articulated to the corresponding two columns 4A, 4B to rotate about horizontal axes and a top horizontal crossmember 18A likewise has its ends articulated to the corresponding two columns 4A, 4B to rotate about horizontal axes 7C, 7D.

The crossmember 9' has at its upper end a connecting arrangement allowing the crossmember 9' in question to move relative to the corresponding column 4A at that end. This connecting arrangement is identical to that already described in connection with the second embodiment and comprises a longitudinal slot 9'A at the end of the corresponding crossmember 9' through which passes by the rotation articulation of that end to the corresponding column which forms a pivot 9'B on the corresponding column passing through the slot.

The crossmember 10" includes a turnbuckle 11" for adjusting the length of the crossmember.

FIG. 7 shows a maximum movement toward the right. The turnbuckle 11" is then set to a long length.

Conversely, FIG. 8 shows a maximum movement toward the left. The turnbuckle 11" is set adjusted to a short length.

The rear crossmember assembly is symmetrical to the front crossmember assembly with respect to the vertical plane of symmetry of the support.

In its specific application already described and shown in FIG. 1, the support carries a disconnector 3 and an overhead line bushing, not shown in FIGS. 7 and 8.

For example, in the case of very high voltage shielded electrical plant, a support according to the invention for supporting electrical plant weighing several tons can have a height of approximately 2 meters to 2.5 meters and allow a movement of 100 mm at its summit.

In the embodiments described, the columns of the support are substantially vertical and rest on a horizontal support surface. The invention applies equally well to supports of this kind disposed on inclined support surfaces, such as may be used for electrical plant. For example, the columns can be inclined to the vertical at an angle of approximately 30°.

Moreover, the columns can rest directly or indirectly on the support surface.

For example, instead of connecting the front columns 4A, 4B rigidly to the rear columns 5A, 5B by means of rigid crossing crossmembers, as shown in FIG. 2, at least two of the crossing crossmembers can be replaced by a bottom crossmember 20, as shown diagrammatically in FIGS. 9 and 10.

That crossmember 20, which is horizontal here, is rigidly fixed to the bottom ends of the columns 4B and 5B. This variant has the advantage of freeing up the space between the columns 4B and 5B, which is beneficial in the specific application of the invention to medium-voltage or high-voltage electrical plant. It increases the freedom for positioning the connecting compartment 8 of an assembly as shown in FIG. 1.

Moreover, the crossmember 20 here has at its ends flanges 20A disposed under the lower ends of the columns 4B and 5B. It is these flanges 20A that are articulated to rotate about the axis 7B.

The term "column" used in the above description includes as much a column consisting of a single elongate part as previously described as a plurality of parts fastened together constituting a column, such as the column 4B and the attached flange 20A here.

There is claimed:

1. A support for high-voltage or medium-voltage electrical plant, comprising:

four columns adapted to be placed on a support surface and connected in pairs by crossmember assemblies, in which support said columns are each articulated to rotate about a first horizontal axis at their end resting on said support surface and about a second horizontal axis on a top crossmember at their other end, said first and second axes being parallel, and two opposite crossmember assemblies are adapted to allow the two columns connected by one or the other of said two assemblies to move in a stable manner in their rotation plane.

2. The support claimed in claim 1, wherein said two opposite crossmember assemblies each comprise two crossing crossmembers whose uprights have on two corresponding columns a first articulation for rotation about a third axis perpendicular to the longitudinal axis of said columns.

3. The support claimed in claim 2, wherein said two crossing crossmembers of said opposite crossmember assemblies each comprise an arrangement for modifying the distance between their two first rotational articulations.

4. The support claimed in claim 3, wherein said two crossmembers of said opposite crossmember assemblies each comprise two crossmember sections connected end-to-end by a second articulation for rotation about an axis parallel to said third axis.

5. The support claimed in claim 3, wherein said modification arrangement comprises a connecting arrangement allowing one end of said crossmember to move relative to the corresponding column.

6. The support claimed in claim 5, wherein said connecting arrangement comprises a longitudinal slot on said crossmember and through which said first rotation articulation passes.

7. The support claimed in claim 3, wherein said modification arrangement comprises an arrangement for adjusting the length of said crossmember.

8. The support claimed in claim 7, wherein said arrangement for adjusting the length of said crossmember is a turnbuckle.

9. The support claimed in claim 2, wherein the two crossmembers of said opposite crossmember assemblies are connected together by a connecting arrangement allowing their relative movement.

10. The support claimed in claim 9, wherein said connecting arrangement comprises a longitudinal slot on each of said crossmembers and a clamping member passing through both said slots.

11. The support claimed in claim 1, wherein said two crossmember assemblies are symmetrical with respect to a vertical plane of symmetry of said support.

12. Shielded electrical plant housed in a metal enclosure and comprising a substantially horizontal first unit and, at one end at least of said first unit, a second unit carried by a support as claimed in claim 1.

13. The plant claimed in claim 12, wherein said first unit is a circuit-breaker.

* * * * *